United States Patent [19]

Behnke

[11] Patent Number: 5,032,862
[45] Date of Patent: Jul. 16, 1991

[54] FILM USE INDICATOR

[76] Inventor: Howard N. Behnke, 1888 E. Rockledge Dr., Las Vegas, Nev. 89119

[21] Appl. No.: 502,815

[22] Filed: Apr. 2, 1990

[51] Int. Cl.⁵ .............................................. G03B 17/26
[52] U.S. Cl. .................................................. 354/275
[58] Field of Search ......................... 354/21, 275, 354; 242/71, 71.1, 71.2; 206/389, 408, 409

[56] References Cited

U.S. PATENT DOCUMENTS 2,303,173  11/1942  Roehrl ............................ 242/71.1
4,682,870   7/1987  Atkinson .......................... 354/275

Primary Examiner—L. T. Hix
Assistant Examiner—David M. Gray
Attorney, Agent, or Firm—William W. Haefliger

[57] ABSTRACT

A camera apparatus has a body to receive a canister containing a film spool defining a hollow shaft portion, the hollow shaft portion adapted to receive penetration of a spool rewind plunger carried on the camera body. The canister has an annular end wall with an outer side; and a frangible indicator layer extending proximate the end wall outer side, and carried by the canister; the indicator layer extending in registration with the hollow shaft portion to be punctured or penetrated by the plunger when the canister is assembled into the body, such penetration indicating that film carried by and rewound upon the spool has been exposed.

5 Claims, 1 Drawing Sheet

FILM USE INDICATOR

BACKGROUND OF THE INVENTION

This invention relates generally to camera apparatus, and more particularly concerns an indicator on a spool of camera film to indicate that the film has been used.

When camera users take rolls of film to developers for development, they commonly will have multiple film rolls, some of which are used (exposed), others of which have not been used. This requires time-consuming sorting of the film rolls, as otherwise unexposed film would be wasted by passage through the developing process. While attempts have been made to solve this problem, I am not aware of any devices which possess the unusual advantages in structure, function and results, as are characterized by the present invention.

SUMMARY OF THE INVENTION

It is a major object of the invention to provide a simple, convenient, foolproof solution to the above problem. The invention takes advantage of the cooperation between the film spool and the spool rewind plunger to provide an indicator having the advantages referred to. The environment of the invention includes camera apparatus having a body to receive a canister containing a film spool defining a hollow shaft portion, the latter adapted to receive penetration of a spool rewind plunger carried on the camera body. In this environment, the invention comprises:

i) a frangible indicator layer extending proximate the canister end wall outer side, and carried by the canister, ii) that layer extending in registration with the hollow shaft portion to be penetrated or punctured by the plunger when the canister is assembled into the body, such penetration indicating that film carried by and rewound upon the spool has been exposed.

As will appear, the frangible layer may comprise a disc having a face attached to the end wall as by attachment of paper layer surface extent to surface extent of the end wall. When penetrated, a hole is produced through the paper layer, which may also have film expiration date indication thereon.

Further, the paper disc may be adhesively bonded to the canister end wall to overlie a bore in the spool that receives the plunger for rewind purposes.

These and other objects and advantages of the invention, as well as the details of an illustrative embodiment, will be more fully understood from the following specification and drawings, in which:

DRAWING DESCRIPTION

DETAILED DESCRIPTION

Figure 1:
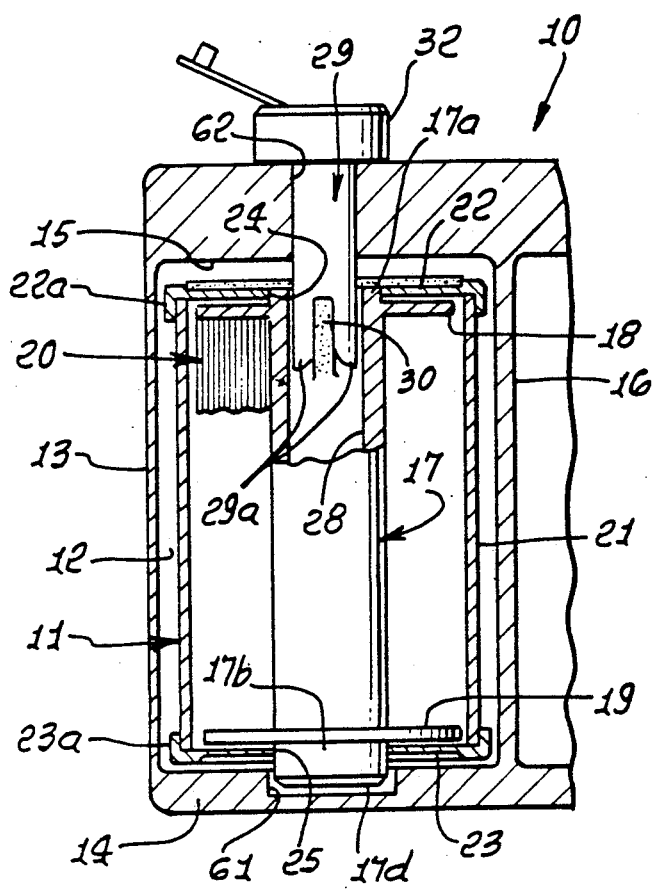
FIG. 1 is a section taken through a film spool in a camera case with the rewind plunger displaced through the indicator disc.
Figure 3:
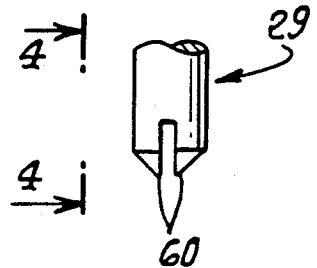
FIG. 3 is a fragmentary side elevation showing an end portion of the plunger.
Figure 4:
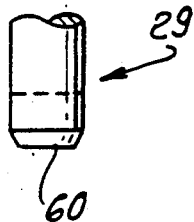
FIG. 4 is a side elevation taken on lines 4—4 of FIG. 3.

In the drawings, a camera case 10 is adapted to receive a film spool 11 in a zone 12, formed by walls 13–16 The spool 11 includes a tubular shaft or hub 17 and two end flanges 18 and 19. Layers of film wound on the hub are indicated generally at 20. A cylindrical canister wall 21 surrounds the spool, and canister end caps 22 and 23 have turned annular skirts 22a and 23a fitting over the axially opposite ends of the canister wall 21, as shown.

Figure 5:
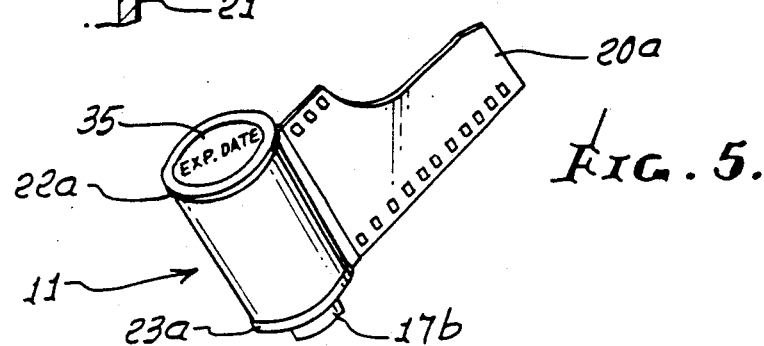
FIG. 5 is a perspective view of a film spool employing the indicator disc of the invention.

The canister end caps 22 and 23 form bores 24 and 25 that receive the hub end projections 17a and 17b, allowing rotation of the hubs within the canister as film is wound onto or off the spool. See the end portion 20a of the film extending from a slit in the canister wall in FIG. 5.

The shaft or hub is typically hollow and forms a bore at 28 for reception or penetration of a spool rewind plunger 29 carried by the camera body. As shown, that plunger may have a bifurcated end with spaced tines 29a that endwise envelope a rewind web 30 in and integral with the spool 11. This occurs in response to axially endwise displacement of the plunger into the spool. Note for example FIG. 2 position of the plunger, outside the spool, and FIG. 1 position of the plunger fully displaced into the hollow hub to mesh with the web 30. As a result, the knob 32 on the end of the plunger may then be rotated to effect rotation of the spool, as for example during rewind of the film onto a spool.

Figure 2:
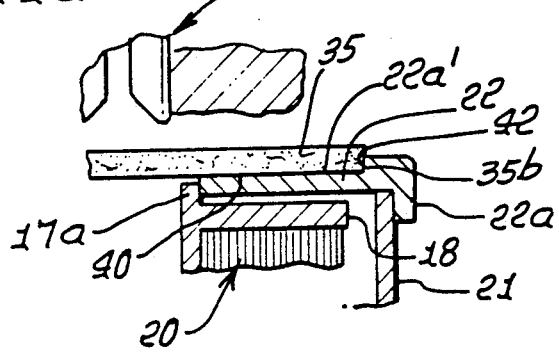
FIG. 2 is an enlarged, fragmentary section showing the plunger initially poised to penetrate the frangible disc.

In accordance with the invention, a frangible indicator layer 35 is located to extend proximate the outer side or face 22a of the end wall or cap 22 as seen in FIG. 2. The layer 35 is typically in the form of a thin disc extending in endwise registration with the hollow hub 17 to be penetrated by the plunger when the connector is assembled to the camera body, as viewed in FIG. 1; and such penetration, i.e., the opening punched on the disc, indicates that the film carried by and rewound upon the spool has been exposed.

The disc or layer 35 is preferably carried by the canister end wall, and may have its face attached, as by adhesive at 40 to the end wall. Note that the disc periphery 35b in FIG. 2 is adjacent the inner annular surface 42 of the cap, and is thus protected against peel off.

Figure 6:
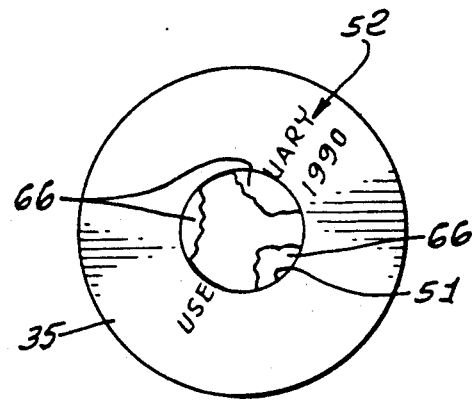
FIG. 6 is a plan view of the disc after its penetration by the plunger.

FIG. 6 shows the disc opening 51 formed by penetration of the plunger tines through the disc. Those tines are tapered, i.e., sharpened at 60. Typically, such opening 51 interrupts indicia 52 on the disc outer side, that indicia for example constituting printing of the use date or period for the film in the canister. Note disc puncture fragments at 66 in FIG. 6.

Flanges 18 and 19 are closely confined in the canister by end caps 22 and 23. Hub end projection 17d extends through cap 23 and into a bore 61 in the camera wall 14, acting as a bearing for spool rotation. The bore 62 in camera wall 15 acts as a bearing for rotation of the cylindrical plunger 29, as the latter rotates the spool in response to knob 32 rotation.

I claim:

1. In camera apparatus having a body to receive a canister containing a film spool defining a hollow shaft portion, the hollow shaft portion adapted to receive penetration of a spool rewind plunger carried on the camera body, the combination comprising a) said canister having a cylindrical wall and a cap defining an annular end wall with an outer side and defining an opening in registration with said hollow shaft portion to pass said plunger, the cap having a skirt engaging said cylindrical wall, b) and a frangible indicator layer extending proximate said end wall outer side, and carried by the cap, c) said layer extending over said opening and in registration with said hollow shaft portion to be penetrated by said plunger when the canister is assembled into said body, such penetration producing a puncture indicating that film carried by and rewound upon the spool has been exposed, d) said layer comprising a disc having a face attached to the cap end wall, e) the cap also defining an inner annular surface presented inwardly toward the disc periphery to protect the disc against peel off, the disc periphery extending closely adjacent said inner annular surface, inwardly of said skirt.

2. The combination of claim 1 wherein said layer has surface extent thereof attached to surface extent of the cap end wall.

3. The combination of claim 1 wherein said layer consists of paper, or the like, and has film expiration indicia thereon.

4. The combination of claim 1 wherein said plunger projects through an opening in said layer formed upon plunger displacement through the layer, there being a rewind knob integral with the plunger and spaced from said layer.

5. The combination of claim 1 wherein said layer is adhesively bonded to said cap end wall.

* * * * *